(12) United States Patent
Lee et al.

(10) Patent No.: US 6,512,565 B1
(45) Date of Patent: *Jan. 28, 2003

(54) HOMEOTROPIC ALIGNMENT LIQUID CRYSTAL DISPLAY HAVING MULTI-DOMAIN

(75) Inventors: Seung Hee Lee, Kyoungki-do (KR); Yun Hee Lee, Seoul (KR); In Cheol Park, Seoul (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/320,086

(22) Filed: May 26, 1999

(30) Foreign Application Priority Data

May 29, 1998 (KR) .............................................. 98-19604

(51) Int. Cl.$^7$ ....................... G02F 1/1337; G02F 1/1343
(52) U.S. Cl. ........................ 349/130; 349/141; 349/128
(58) Field of Search ................................. 249/130, 141, 249/128, 129, 143, 147

(56) References Cited

U.S. PATENT DOCUMENTS

| | | | |
|---|---|---|---|
| 5,477,359 A | 12/1995 | Okazaki | 359/77 |
| 5,479,187 A | 12/1995 | Chen | 345/102 |
| 5,515,045 A | 5/1996 | Tak | 341/23 |
| 5,592,193 A | 1/1997 | Chen | 345/102 |
| 5,621,382 A | 4/1997 | Yamamoto | 340/432 |
| 5,666,179 A | 9/1997 | Koma | 349/143 |
| 5,745,206 A | 4/1998 | Koike et al. | 349/129 |
| 5,751,020 A | 5/1998 | Lyu | 257/72 |
| 5,783,764 A | 7/1998 | Amar | 84/479 |
| 5,861,929 A | 1/1999 | Spitzer | 349/74 |
| 5,946,066 A * | 8/1999 | Lee et al. | 349/141 |
| 6,088,078 A * | 7/2000 | Kim et al. | 349/141 |
| 6,128,061 A * | 10/2000 | Lee | |
| 6,144,434 A * | 11/2000 | Kim et al. | 349/130 |
| 6,177,973 B1 * | 1/2001 | Lee et al. | 349/123 |
| 6,208,398 B1 * | 3/2001 | Scherer et al. | 349/124 |
| 6,256,081 B1 * | 7/2001 | Lee et al. | 349/141 |
| 6,266,118 B1 * | 7/2001 | Lee et al. | 349/141 |

FOREIGN PATENT DOCUMENTS

| | | |
|---|---|---|
| JP | 8-64137 | 3/1996 |
| JP | 9-232646 | 9/1997 |
| JP | 9-311169 | 12/1997 |
| JP | 10-148826 | 6/1998 |

* cited by examiner

*Primary Examiner*—Toan Ton
*Assistant Examiner*—Mike Qi
(74) *Attorney, Agent, or Firm*—Ladas & Parry (57) ABSTRACT

The present invention provide a homeotropic alignment liquid crystal display having a multi-domain which is capable of obtaining symmetrical viewing angles and simultaneously preventing color shift.

An upper substrate and a lower substrate are opposed each other to be spaced apart and a liquid crystal layer interposed between inner surfaces of the upper and lower substrates. A first electrode and a second electrode are formed on the inner surface of the lower substrate, wherein the first electrode and the second electrode form an electric field for driving liquid crystal molecules. Further, homeotropic alignment layers are interposed between the lower substrate and the liquid crystal layer and between the upper substrate and the liquid crystal layer respectively. After a selected voltage is applied to the first and second electrodes, there are formed simultaneously a first electric field having a selected angle with a first direction and a second electric field making a symmetry with the first electric field with respect to the first electric field and the first direction. Therefore, the liquid crystal molecules are tilted in their left side and right side with respect to the center lines of electric fields thereby forming four symmetric liquid crystal domains within one pixel region.

26 Claims, 7 Drawing Sheets

HOMEOTROPIC ALIGNMENT LIQUID CRYSTAL DISPLAY HAVING MULTI-DOMAIN

FIELD OF THE INVENTION

The present invention relates to a liquid crystal display, more particularly to a homeotropic alignment liquid crystal display of active matrix type.

BACKGROUND OF THE INVENTION

Generally, the In-plane Switching(hereinafter IPS) mode liquid crystal display has been suggested to improve narrow viewing angle characteristics of the Twisted Nematic (hereinafter TN) mode liquid crystal display. However, the IPS mode liquid crystal display makes an electric field parallel to substrates thereby improving the viewing angle characteristics. The IPS mode liquid crystal display has also a slow response time and a complicated manufacturing process is required to make a dual-domain. U.S. patent application Ser. No. 09/050,292 discloses a vertically aligned IPS (hereinafter IPS-VA) mode liquid crystal display to solve the foregoing problems.

The conventional IPS-VA mode liquid crystal display has following constitution.

Figure 1A:
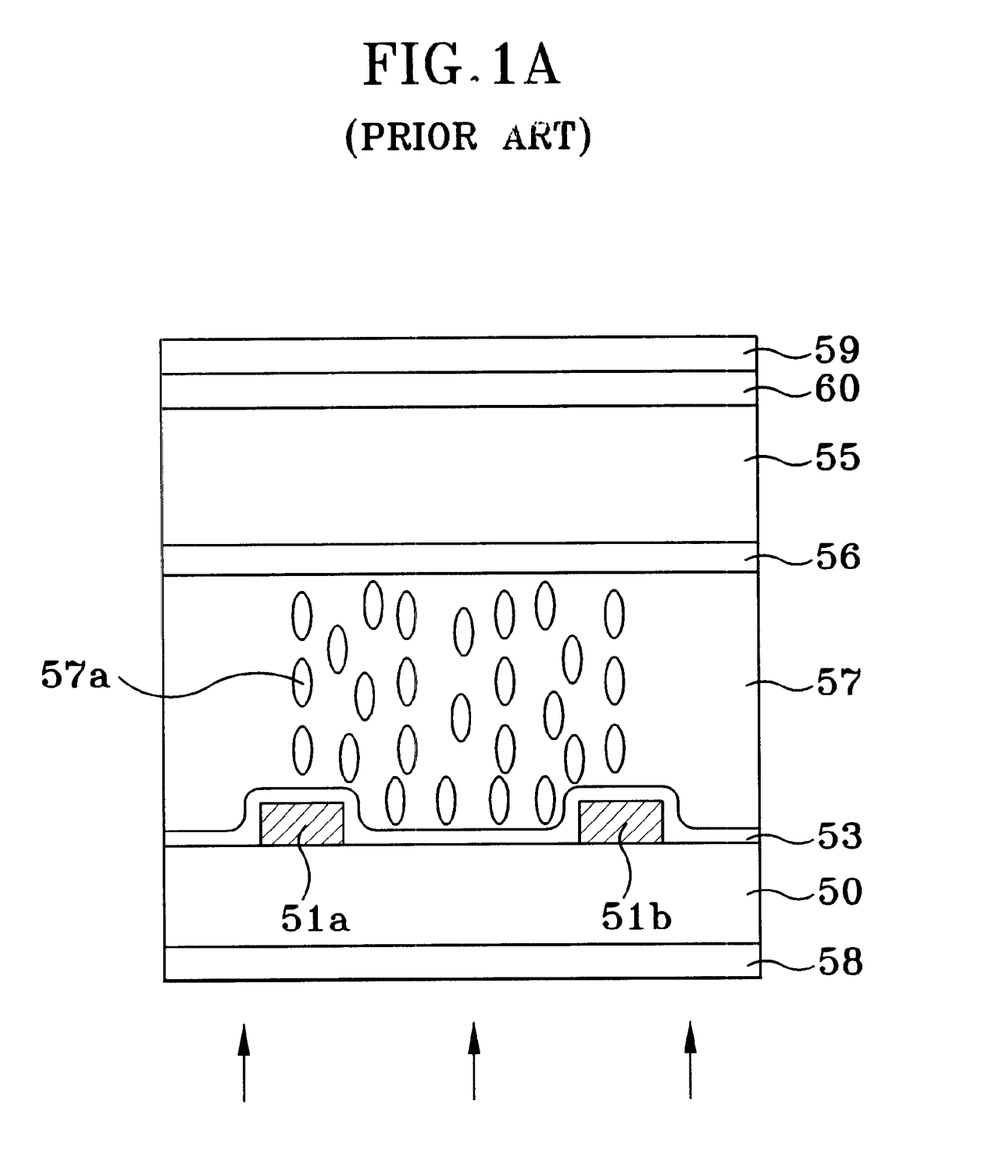
FIGS. 1A to 1B are cross-sectional views showing a conventional IPS-VA mode liquid crystal display.
Figure 1B:
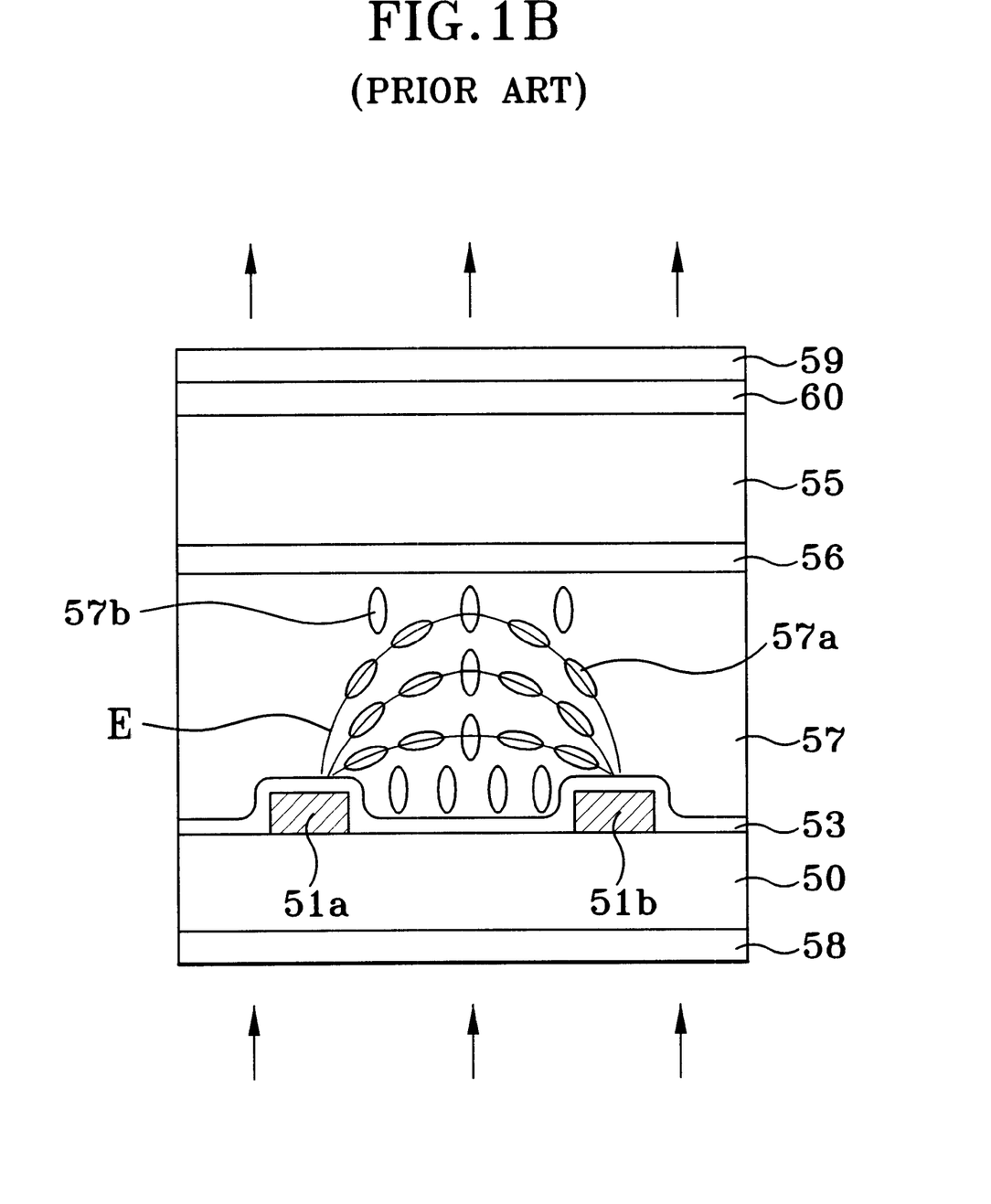

Referring to FIGS. 1A and 1B, a counter electrode 51a and a pixel electrode 51b are disposed parallel to each other at an inner surface of a lower substrate 50 in a stripe manner. A first homeotropic alignment layer 53 is formed over the lower substrate 50 where the counter and pixel electrodes 51a, 51b are formed.

A color filter(not shown) is formed at an inner surface of an upper substrate 55 and a second homeotropic alignment layer 56 is formed on a surface of the color filter.

A liquid crystal layer 57 having a plurality of liquid crystal molecules 57a is interposed between the lower substrate 50 and the upper substrate 55. Herein, the liquid crystal molecules 57a are nematic molecules and have both dielectric and refractive anisotropic properties.

A first polarizing plate 58 is disposed at an outer surface of the lower substrate 50 and a second polarizing plate 59 is disposed at an outer surface of the upper substrate 55. Polarizing axes of the first and second polarizing plates 58,59 are crossed each other, and they make an angle of approximately ±45° with an electric field being generated between the counter electrode 51a and the pixel electrode 51b. A phase compensating film 60 is interposed between the upper substrate 55 and the second polarizing plate 59 so as to compensate the refractive anisotropy of liquid crystal molecules 57a.

In the absence of electric field between the counter electrode 51a and the pixel electrode 51b, as shown in FIG. 1A, the liquid crystal molecules 57a are arranged such that their long axes are disposed almost perpendicular to the substrates 50,55 according to the influence of the first and second homeotropic alignment layers 53,56. Consequently, since an incident light to pass the first polarizing plate 58 does not change its polarizing state while passing the liquid crystal molecules 57a, the incident light does not pass the second polarizing plate 59. The screen according to viewing angles shows a complete dark state since the refractive anisotropy of the liquid crystal molecules 57a according to the viewing angles is compensated by the phase compensating film 60.

On the other hand, a predetermined voltage is applied between the counter electrode 51a and the pixel electrode 51b, as shown in FIG. 1B, an electric field E is formed almost parallel to the lower substrate 50. And then, the liquid crystal molecules 57a which are disposed perpendicular to the substrates, are arranged such that their long axes are arranged to be parallel to the electric field E in case a liquid crystal of positive dielectric anisotropy is used. At this time, liquid crystal molecules 57a in the left side of the center of the electric field E are aligned in a clockwise direction and liquid crystal molecules 57a in the right side of the center of the electric field E are aligned in a counter-clockwise direction thereby forming two domains without incurring additional manufacturing process. Herein, liquid crystal molecules 57b in the center of the electric field E are affected by both sided liquid crystal molecules 57a having the same intensity in opposite directions. Therefore, they maintain their initial vertically aligned state. At this time, the liquid crystal molecules 57b keeping their initial vertically aligned state become a boundary of the two domains.

As described, since the liquid crystal molecules 57a are arranged parallel to the electric field E, an incident light to pass the first polarizing plate 58 changes its polarizing state while passing the liquid crystal layer 57. Accordingly, the light can pass the second polarizing plate 59, whereby the screen can be shown in a white state.

The IPS-VA mode liquid crystal display as constituted above improves the response time characteristics of display devices since the devices employ homeotropic alignment layers, and there is no need to perform any rubbing process to form two domains.

However, the IPS-VA mode liquid crystal display incurs following problems.

Since an electric field in one direction is formed within a pixel, the viewing angle characteristic of a region where the electric field is formed is superior to that of other regions where no electric field is formed.

Figure 2:
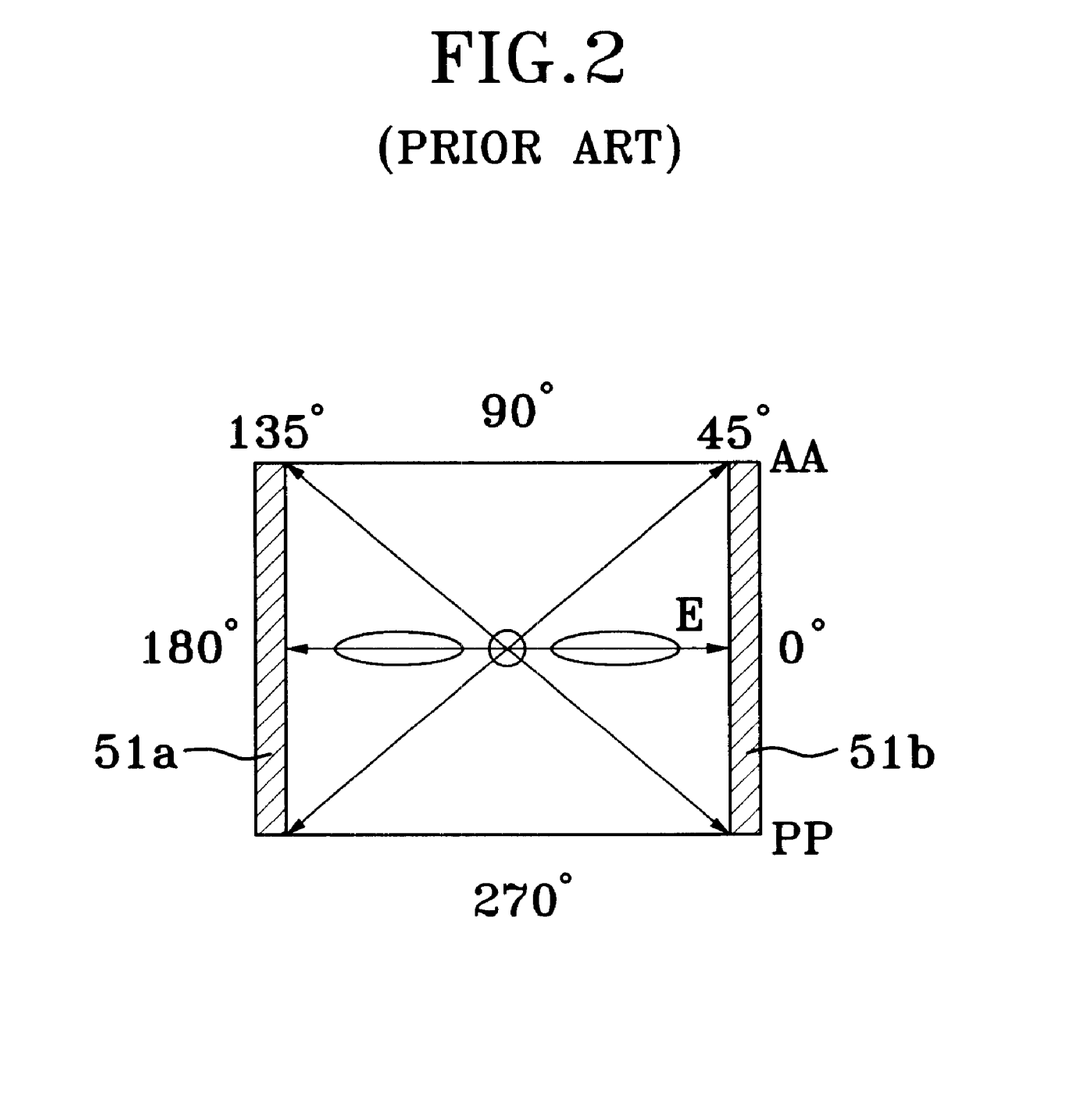
FIG. 2 illustrates the arrangement of polarizing axis, absorbing axis and electric field in the conventional IPS-VA mode liquid crystal display.

In other words, as shown in FIG. 2, liquid crystal molecules in a horizontal direction where the electric field is formed, i.e. at 0° and 180° make a complete symmetry in their left side and right side since the liquid crystal molecules are arranged symmetrical themselves. However, liquid crystal molecules in perpendicular and oblique directions where no electric field is formed, i.e. at 90°, 270° and at 45°, 135°, do not make any symmetry. Especially, in the oblique directions, there is even occurred a color shift that a selected color is shown in the white state screen.

Accordingly, it is one object of the present invention to provide a homeotropic alignment liquid crystal display having a multi-domain capable of obtaining a complete viewing angle characteristic at all azimuth angles in the screen.

It is another object of the present invention to provide a homeotropic alignment liquid crystal display having fast response time.

It is still object of the present invention to provide a homeotropic alignment liquid crystal display capable of preventing color shift in all azimuth angles in the screen.

SUMMARY OF THE INVENTION

So as to accomplish the forgoing objects, the present invention provides a homeotropic alignment liquid crystal display having a multi-domain comprising:

an upper substrate and a lower substrate opposed each other to be spaced apart;

a liquid crystal layer interposed between inner surfaces of the upper and lower substrates, the liquid crystal layer including a plurality of liquid crystal molecules;

a first electrode formed on the inner surface of the lower substrate; and a second electrode formed on the inner surface of the upper substrate, wherein the first electrode and the second electrode form an electric field for driving the liquid crystal molecules;

wherein in the absence of electric field between the first and second electrodes, the liquid crystal molecules are aligned such that their long axes are vertical to surfaces of the substrates, wherein after applying a selected voltage to the first and second electrodes, first and second electric fields are formed simultaneously, the first electric field having a selected angle with a first direction and the second electric field having a symmetry with the first electric field with respect to the first direction;

wherein the selected angle between the first electric field and the first direction is in the range of 20~70°.

The present invention further provides a homeotropic alignment liquid crystal display having a multi-domain comprising:

an upper substrate and a lower substrate opposed each other to be spaced apart;

a liquid crystal layer interposed between inner surfaces of the upper and lower substrates, the liquid crystal layer including a plurality of liquid crystal molecules;

a gate bus line and a data bus line formed in the lower substrate in a matrix configuration and both defining pixel regions;

a counter electrode formed at each pixel region in the lower substrate, the counter electrode including a body of a rectangular frame shape, a first branch being disposed parallel to the gate bus line and simultaneously connecting lengthwise sides of the body and dividing a region surrounded by the body into a first space and a second space, a second branch diverged from the body or the first branch toward the first space in the form of a diagonal line, and a third branch diverged from the body or the first branch toward the second space in the form of a diagonal line;

a pixel electrode formed at each pixel region in the lower substrate and the pixel electrode forming an electric field together with the counter electrode, the pixel electrode including a first bar overlapped with one of the lengthwise sides of the body of the counter electrode and disposed parallel to the data bus line, a second bar diverged from the first bar and extended to be overlapped with the first branch of the counter electrode, a third bar diverged from the first or second bar and interposed between the second branches of the counter electrode in parallel, and the fourth bar diverged from the first bar or the second bar and interposed between the third branches of the counter electrode in parallel;

a switching means formed adjacent to an intersection of the gate bus line and the data bus line for transmitting a signal from the data bus line to the pixel electrode; and homeotropic alignment layers interposed between the lower substrate and the liquid crystal layer and between the upper substrate and the liquid crystal layer, wherein the counter electrode and the pixel electrode are formed in the lower substrate;

wherein the second branch makes an angle θ with the second branch of the counter electrode, the third branch makes an angle −θ with the second branch of the counter electrode;

wherein the angle θ is in the range of 20~70°.

Herein, a first polarizing plate is disposed at an outer surface of the lower substrate and a second polarizing plate is disposed at an outer surface of the upper substrate. A polarizing axis of the first polarizing plate is coincided with the first direction or the second direction and a polarizing axis of the second polarizing plate is arranged perpendicular to the polarizing axis of the first polarizing plate.

DETAILED DESCRIPTION OF THE PREFERRED EMBODIMENTS

Hereinafter, detailed description of the preferred embodiments will be followed with reference to the attached drawings.

Figure 3:
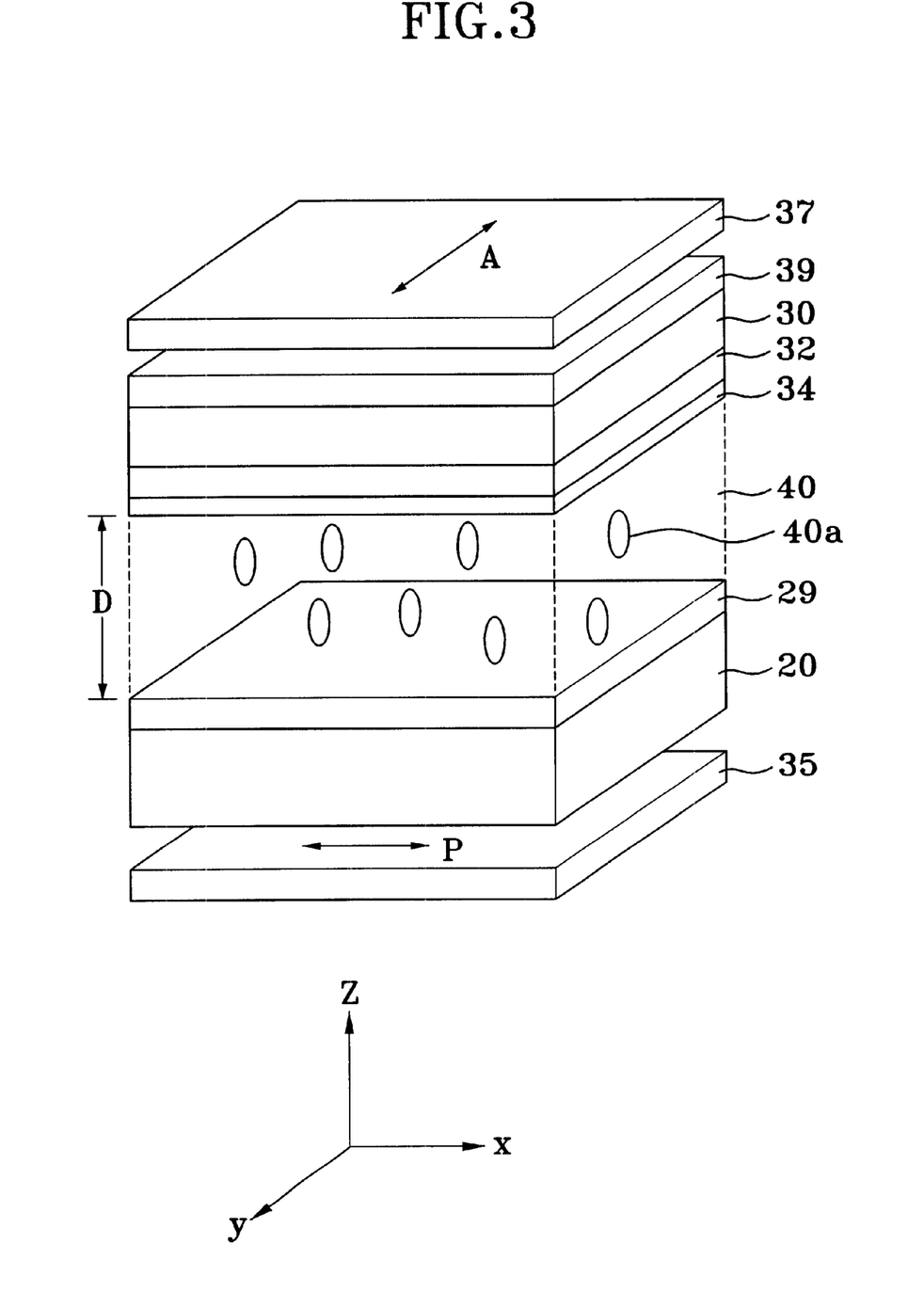
FIG. 3 is a perspective view showing an IPS-VA mode liquid crystal display having a multi-domain according to the present invention.
Figure 4:
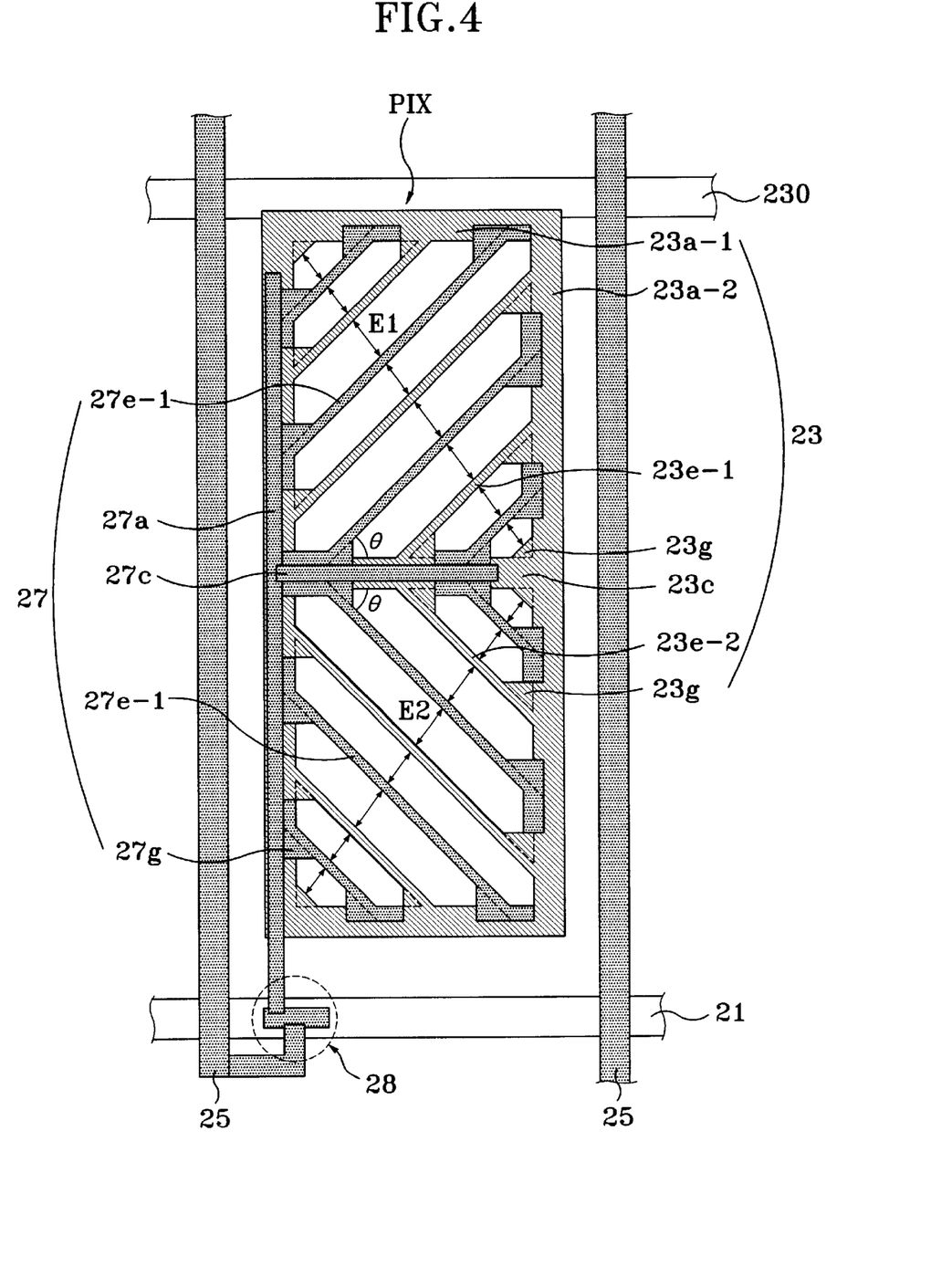
FIG. 4 is a plan view showing a lower substrate of the IPS-VA mode liquid crystal display having a multi-domain according to the present invention.
Figure 5:
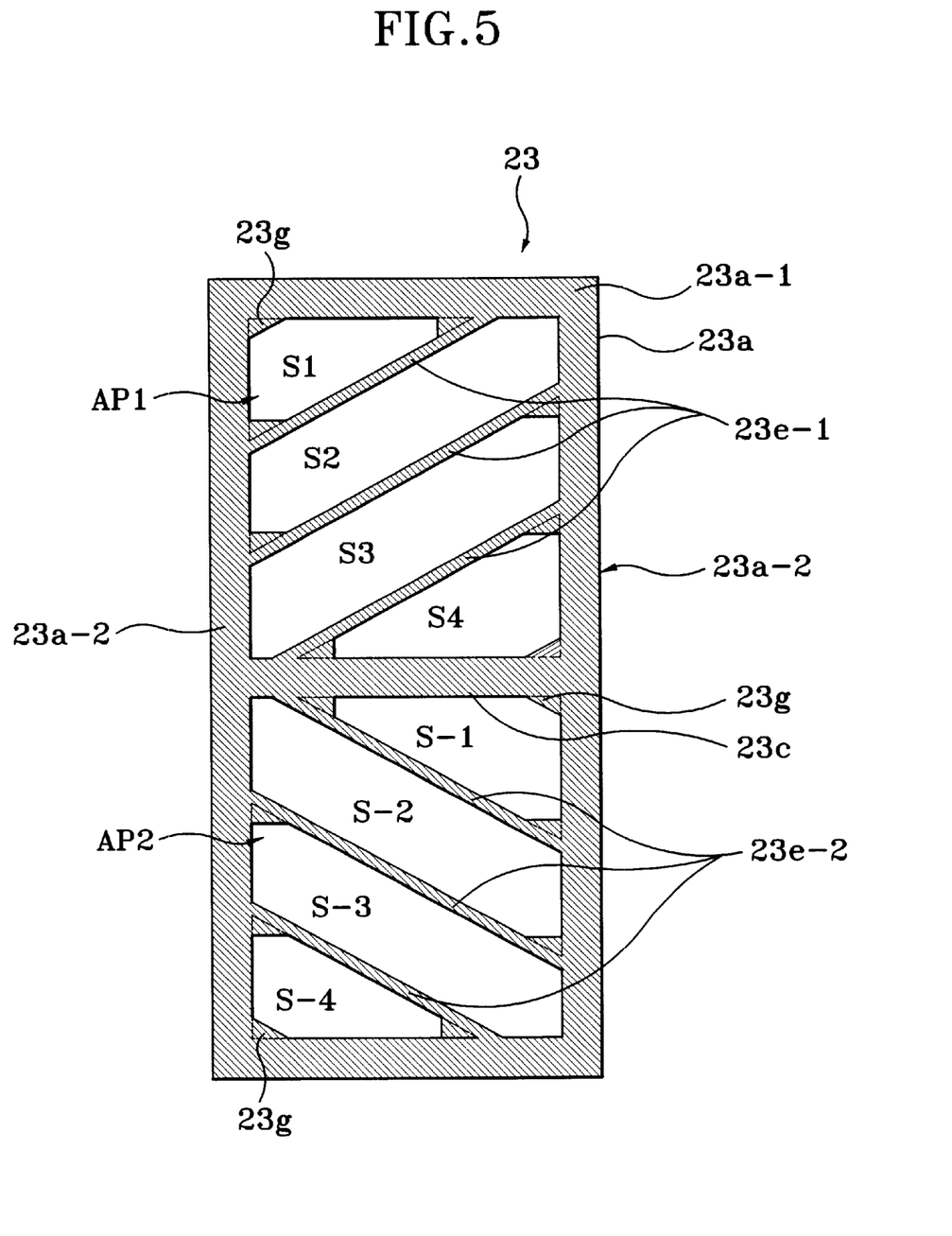
FIG. 5 is a plan view showing a counter electrode of the liquid crystal display according to the present invention.
Figure 6:
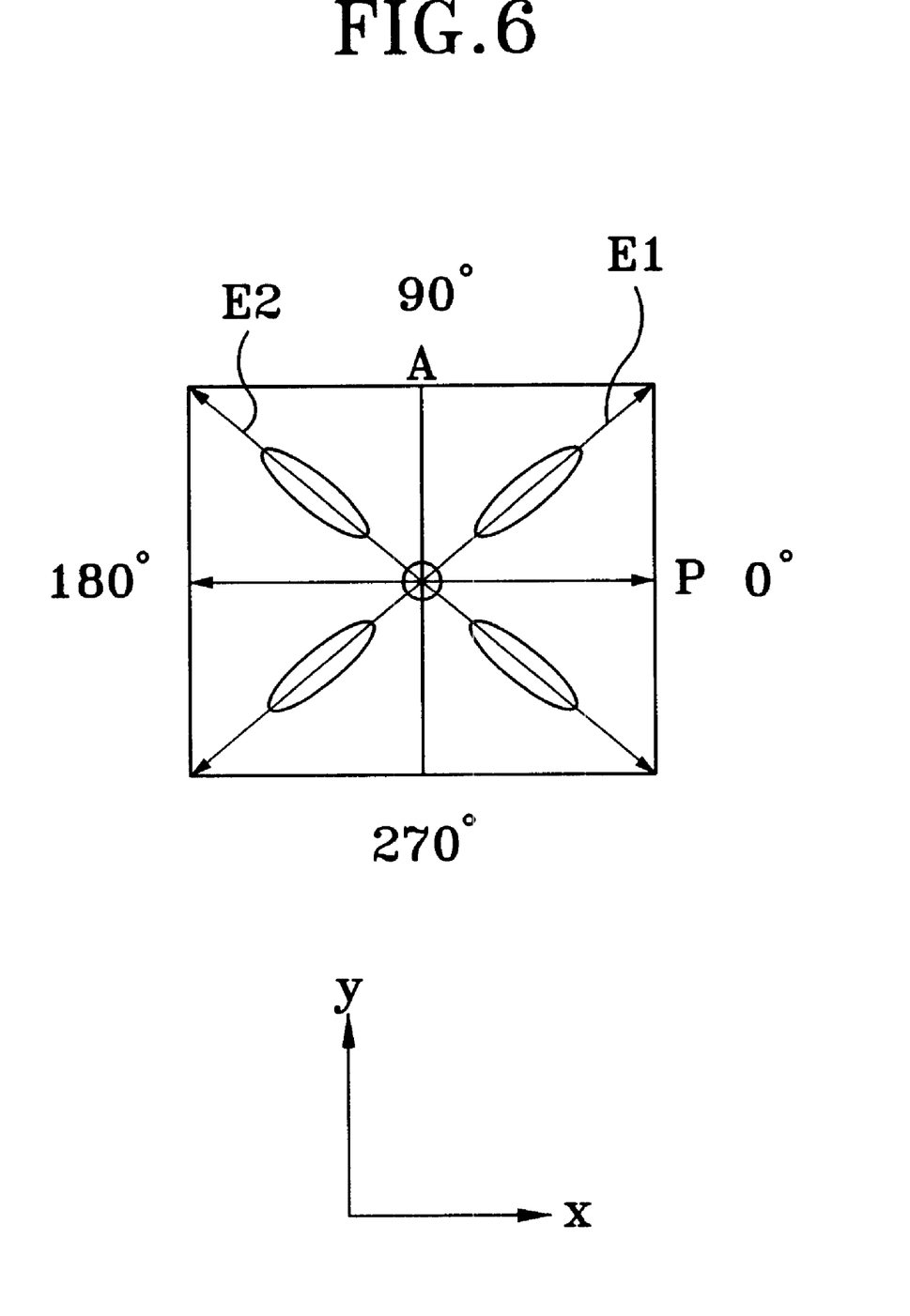
FIG. 6 shows the arrangement of polarizing axis, absorbing axis and electric field in the IPS-VA mode liquid crystal display as shown in FIG. 4.

Attached FIG. 3 is a perspective view showing an IPS-VA mode liquid crystal display having a multi-domain according to the present invention. FIG. 4 is a plan view showing a lower substrate of the IPS-VA mode liquid crystal display having a multi-domain according to the present invention. FIG. 5 is a plan view showing a counter electrode of the liquid crystal display according to the present invention. FIG. 6 shows the arrangement of polarizing axis, absorbing axis and electric field in the IPS-VA mode liquid crystal display as shown in FIG. 4.

As show in FIGS. 3 and 4, a lower substrate 20 and an upper substrate 30 are opposed with a selected cell gap D. Herein, at least one of the two substrates 20 and 30 is made of a transparent insulating material. A liquid crystal layer 40 is interposed between the lower substrate 20 and the upper substrate 30. The liquid crystal layer 40 includes a plurality of nematic liquid crystal molecules and the liquid crystal molecules have, for instance, a positive dielectric anisotropic property.

In an inner surface of the lower substrate 20, a gate bus line 21 is extended in an x direction and a data bus line 25 is extended in a y direction which is substantially perpendicular to the x direction thereby defining a pixel PIX. Herein, one pixel PIX can be defined by a pair of gate bus lines 21 and a pair of data bus lines 25.

Further, the pixel PIX has a rectangular shape that the width to length ratio is 1:3. Although not shown in the drawing, an insulating layer is interposed between the gate bus line 21 and the data bus line 25 thereby electrically insulating therebetween.

A counter electrode 23 is formed in each pixel PIX. Herein, the counter electrode 23 is spaced from the gate bus line 21 and the data bus line 25 by a selected distance. FIG. 5 shows only the counter electrode 23. Referring to FIG. 5, the counter electrode 23 includes a body 23a having a rectangular frame shape. In the drawing, the reference numeral 23a-1 stands for a portion in the x direction and the reference numeral 23a-2 is a portion in the y direction. The counter electrode 23 also includes a first branch 23c which connects the portions 23a-2 in the y direction. Herein, the first branch 23c is parallel to the x direction and is disposed at the center of the body 23a thereby dividing a region surrounded by the body 23a into a first space AP1 and a second space AP2. The counter electrode 23 further includes a plurality of second and third branches 23e-1, 23e-2 which are disposed in the form of diagonal lines with respect to the first branch 23c within the first space AP1 and the second space AP2. The second and third branches 23e-1, 23e-2 divide the first space AP1 and the second space AP2 respectively thereby dividing those spaces AP1 and AP2 into a plurality of sub spaces s1~4,s-1~4. Herein, the second branch 23e-1 and the third branch 23e-2 are disposed parallel each other with a regular spacing or a random spacing within the first and second spaces AP1, AP2. The second branch 23e-1 and the third branch 23e-2 are disposed symmetrically with respect to the first branch 23c and have a selected angle θ with the first branch 23c.

Furthermore, to prevent undesired edge electric field a rib 23g is formed at a selected corner of the counter electrode 23. The rib 23g has a right-angled triangle shape. The rib 23g formed in the first space AP1 is inserted at right-angled corners of the sub spaces 1 and 4 (s1, s4) so that the hypotenuse of the rib 23g is disposed parallel to the second branch 23e-1. Also, the rib 23g formed in the second space AP2 is inserted at right-angled corners of the sub spaces 1 and 4 (s-1,s-4) so that the hypotenuse of the rib 23g is disposed parallel to the third branch 23e-2.

Another rib 23g of a right-angled triangle shape is disposed and inserted into an acute-angled region which is formed by meeting the body 23a and the second branch 23e-1 and into another acute-angled region which is formed by meeting the body 23a and the third branch 23e-2. The rib 23g of a right-angled triangle shape is also disposed and inserted into an acute-angled region which is formed by meeting the first branch 23c and the second branch 23e-1 and into another acute-angled region which is formed by meeting the first branch 23c and the third branch 23e-2.

A common signal line 230 is formed on the lower substrate 20 so that the common signal line 230 is contacted with the counter electrode 23.

A pixel electrode 27 is also formed in each pixel PIX. The pixel electrode 27 includes a first bar 27a which is overlapped with a selected portion of the body 23a of the counter electrode 23. The first bar 27a overlaps with one of the body 23a-2 which is parallel to the y direction. Preferably, the first bar 27a is disposed to be overlapped with the body 23a-2 adjacent to the data bus line 25 which transmits signal voltages to the corresponding pixel PIX. The width of the first bar 27a of the pixel electrode 27 is equal to or smaller than that of the body 23a-2.

The pixel electrode 27 also includes a second bar 27c which is overlapped with the first branch 23c of the counter electrode 23 and one end of the second bar 27c is connected to the first bar 27a. The width of the second bar 27c is equal to or smaller than that of the first branch 23c of the counter electrode 23 and the second bar 27c is extended in the x direction. The pixel electrode 27 further includes a plurality of third bars 27e-1 and fourth bars 27e-2 in which their respective one ends are connected to the first bar 27a or the second bar 27c and they are branched in the form of diagonal lines toward the first space AP1 and the second space AP2 respectively. The third bar 27e-1 and the fourth bar 27e-2 divide the sub spaces s1~4, s-1~4. The third bar 27e-1 is parallel to the second branch 23e-1 of the counter electrode 23 and the fourth bar 27e-2 is parallel to the third branch 23e-2. The respective third bars 27e-1 are interposed between the second branches 23e-1 and the respective fourth bars 27e-2 are interposed between the third branches 23e-2. Herein, at least one end of the third and fourth bars 27e-1, 27e-2 of the pixel electrode 27 are bent in a selected direction so as to reduce the edge electric field generated at corner regions of the sub spaces s1~4, s-1~4. Preferably, the bending portions of the third and fourth bars 27e-1,27e-2 of the pixel electrode 27 are bent to greater angles between the angles made by meeting the third bar 27e-1 and the body 23a of the counter electrode 23, by meeting the fourth bar 27e-2 and the body 23a, by meeting the third bar 27e-1 and the second bar 27c of the pixel electrode 27, and by meeting the fourth bar 27e-2 and the second bar 27c of the pixel electrode 27 respectively. The bending portions are turned along inner side of the body 23a or the first branch 23c. Further, so as to remove the edge electric field generation, ribs 27g of right-angled triangle shape are inserted into small-angled regions between the regions made by meeting the third bar 27e-1 and the body 23a of the counter electrode 23, by meeting the fourth bar 27e-2 and the body 23a, by meeting the third bar 27e-1 and the first branch 23c of the counter electrode 23, and by meeting the fourth bar 27e-2 and the first branch 23c respectively.

Herein, the second branch 23e-1 and the third bar 27e-1 make an angle θ1, for example 20~70° and preferably 45° with the first branch 23c of the counter electrode 23. Further, the third branch 23e-2 and the fourth bar 27e-2 make an angle θ2, for example −20~70° and more preferably −45° with the first branch 23c of the counter electrode 23.

Furthermore, a transparent or an opaque metal layer can be used for both counter and pixel electrodes 23 and 27. In case the liquid crystal of positive dielectric anisotropy is used, the liquid crystal molecules are driven between the counter electrode 23 and the pixel electrode 27 thereby increasing the width of an aperture region rather than the widths of the respective electrodes 23,27. More concretely, those distances between the second branch 23e-1 of the counter electrode 23 and the third bar 27e-1 of the pixel electrode 27 and between the third branch 23e-2 of the counter electrode 23 and the fourth bar 27e-2 of the pixel electrode 27, are greater in length than the widths of the branches 23e-1,23e-2 of the counter electrode 23 and the widths of the third and fourth bars 27e-1,27e-2 of the pixel electrode 27.

On the other hand, in case the liquid crystal of negative dielectric anisotropy is used, the liquid crystal molecules are driven over upper portions of the counter and pixel electrodes 23,27 thereby increasing widths of the respective electrodes 23,27 rather than the width of the aperture region and the counter and pixel electrodes 23,27 are made of a transparent material.

Furthermore, so as to form an in-plane electric field between the counter and pixel electrodes 23,27, those distances between the second branch 23e-1 of the counter electrode 23 and the third bar 27e-1 of the pixel electrode 27 and between the third branch 23e-2 of the counter electrode 23 and the fourth bar 27e-2 of the pixel electrode 27, are greater in length than the cell gap D preferably.

A storage capacitor is formed at each overlapping portion of the counter electrode 23 and the pixel electrode 27. That is to say, the storage capacitor is formed between the body 23a of the counter electrode 23 and the first bar 27a of the pixel electrode 27, between the first branch 23c of the counter electrode 23 and the second bar 27c of the pixel electrode 27, and between the body 23a of the counter electrode 23 and the bending portions of the third and fourth bars 27e-1,27e-2 of the pixel electrode 27. The reference numeral 26 in FIG. 3 stands for a common electrode line for transmitting common signals to the counter electrode 23.

Adjacent to the intersection of the gate bus line 21 and the data bus line 25, a thin film transistor 28 is disposed as a switching means for transmitting a signal of the data bus line 25 to the pixel electrode 27 when the gate bus line is selected. Herein, the gate bus line 21 becomes a gate electrode for the thin film transistor 28 and the data bus line 25 becomes a source electrode for the thin film transistor 28. Further, the first bar 27a of the pixel electrode 27 is extended to the thin film transistor 28 and becomes a drain electrode for the thin film transistor 28.

A first alignment layer 29 is formed on a surface of a resultant in the lower substrate 20. At this time, the first alignment layer 29 is a homeotropic alignment layer having a pretilt angle of 85~95° which is not rubbed.

A color filter 32 is disposed at an inner surface of the upper substrate 30 and a second alignment layer 34 is formed on a surface of the color filter 32. The second alignment layer 34 is also a homeotropic alignment layer.

A first polarizing plate 35 is disposed on an outer surface of the lower substrate 20 and a second polarizing plate 37 is disposed on an outer surface of the upper substrate 30. Herein, a polarizing axis P of the first polarizing plate 35 is crossed with a polarizing axis A of the second polarizing plate 37. Furthermore, so as to obtain the maximum transmittance, the polarizing axis P of the first polarizing plate 35 is disposed parallel to the directions of the gate bus line or the data bus line and preferably the polarizing axis A of the second polarizing plate 37 is disposed parallel to the directions of the data bus line or the gate bus line.

More detailed description of the IPS-mode liquid crystal display will be discussed according to following equation.

$$T \approx T_0 \sin^2(2\chi) \cdot \sin^2(\pi \cdot \Delta n d/\lambda) \qquad \text{equation 1}$$

wherein,

T: transmittance;

$T_0$: transmittance to the reference light;

$\chi$: angle between an optical axis of liquid crystal molecule and a polarizing axis of the polarizing plate;

$\Delta n$ : refractive anisotropy;

d: distance or gap between the upper and lower substrates (the thickness of the liquid crystal layer); and $\lambda$: wavelength of the incident light.

According to the above equation, the maximum transmittance is obtained when $\chi$ is $\pi/4$. The polarizing axis is disposed parallel to the gate bus line or the data bus line, so as to satisfy the condition that an angle consisting of the electric field being formed between the second branch 23e-1 and the third bar 27e-1, and the polarizing axis should be $\pi/4$.

A phase compensating film 39 for compensating the refractive anisotropy of liquid crystal molecules is interposed between the upper substrate 30 and the second polarizing plate 37. A film made of cured liquid crystal molecules of negative refractive anisotropy can be used for the phase compensating film 39. Further, the value of phase retardation of the phase compensating film 39, i.e. the product of the refractive anisotropy and the thickness of the phase compensating film is equal to the value of phase retardation of the liquid crystal layer 40, i.e. the product of the refractive anisotropy and the distance between the upper and lower substrates. According to the phase compensating film 39, as known previously, the bar type liquid crystal molecules can be looked isotropic to the viewer.

Operation of the liquid crystal display constituted as above is given below.

There is formed no electric field between the counter electrode 23 and the pixel electrode 27 since no signal is transmitted to the pixel electrode 27 when the gate bus line 21 is not selected. And then, the liquid crystal molecules 40a are arranged such that their long axes are vertical to surfaces of the substrates 20,30 under the influence of the first and second alignment layers 29,34. Therefore, an incident light across the first polarizing plate 35 passes the short axes of the liquid crystal molecules 40a and its polarizing state does not change. Consequently, the light to pass the liquid crystal layer 40 does not pass the second polarizing plate 37 whose polarizing axis A is perpendicular to the polarizing axis P of the first polarizing plate 35. The screen shows a dark state. At this time, the refractive anisotropy of the liquid crystal molecules is compensated by the phase compensating film 39 thereby showing a complete dark state.

On the other hand, when a scanning signal is applied to the gate bus line 21 and a display signal is applied to the data bus line 25, the thin film transistor 28 formed adjacent to the intersection of the gate bus line 21 and the data bus line 25 is turned on thereby transmitting the display signal to the pixel electrode 27. Electric fields E1,E2 are formed between the counter electrode 23 to which a common signal is continuously transmitted and the pixel electrode 27. The electric fields E1,E2 are substantially formed between the second branch 23e-1 of the counter electrode 23 and the third bar 27e-1 of the pixel electrode 27, and between the third branch 23e-2 of the counter electrode 23 and the fourth bar 27e-2 of the pixel electrode 27. Herein, the electric field E1 is formed in the first space AP1 and the electric field E2 is formed in the second space AP2. Since the electric fields E1,E2 in the form of diagonal lines are formed as a normal direction of the diagonal branches 23e-1, 23e-2 and the diagonal bars 27e-1, 27e-2, their upper portions and the lower portions make a symmetry with respect to the first branch 23c of the counter electrode 23 or the first bar 27a of the pixel electrode 27.

According to the electric fields E1,E2, the liquid crystal molecules 40a being arranged vertically, are tilted such that their long axes are coincided with the electric fields E1,E2. FIG. 6 shows the arrangement of a polarizing axis P, an absorbing axis A and the electric fields E1, E2. As illustrated in the drawing, the liquid crystal molecules 40b in the center lines of the electric fields E1,E2 maintain their initial alignment state, and other liquid crystal molecules 40a in the left side and the right side of the center line are tilted parallel to the electric fields E1,E2. At this time, there are formed two domains with respect to the central liquid crystal molecules 40b in each electric field E1,E2, and the electric fields E1 and E2 are formed to make a symmetry within the pixel region thereby forming four domains dm1~4 within the pixel PIX. Accordingly, there is occurred no more color shift since a plurality of domains are formed in a pixel.

As described in detail, according to the present invention, a homeotropic alignment layer is used and there are formed electric fields having two different directions which make a symmetry within a pixel region. Therefore, four domains which make symmetries with respect to the x direction and the y direction, are formed within the pixel region. As a result, the viewing angle having symmetries at all points in the screen is obtainable and the liquid crystal molecules are arranged to make symmetries correspondingly thereby preventing the color shift.

Further, by using the homeotropic alignment layer, considerably fast response time is obtainable.

Moreover, an enhanced contrast is shown at 90° and 180° since the polarizing axis of the polarizing plate is disposed in the directions of 90° and 180°, the major viewing directions.

Various other modifications will be apparent to and can be readily made by those skilled in the art without departing from the scope and spirit of the present invention.

What is claimed is:

1. A homeotropic alignment liquid crystal display having a multi-domain comprising:
    an upper substrate and a lower substrate opposed each other to be spaced apart;
    a liquid crystal layer interposed between inner surfaces of the upper and lower substrates, the liquid crystal layer including a plurality of liquid crystal molecules;
    a first electrode formed on the inner surface of the lower substrate; and
    a second electrode formed on the inner surface of the lower substrate, wherein the first electrode and the second electrode form an electric field for driving the liquid crystal molecules;
    wherein in the absence of electric field between the first and second electrodes, the liquid crystal molecules are aligned such that their long axes are vertical to the surfaces of the substrates,
    wherein after applying a selected voltage to the first and second electrodes, first and second electric fields are formed simultaneously, the first electric field having a selected angle with a first direction and the second electric field having a symmetry with the first electric field with respect to the first direction;
    wherein the selected angle between the first electric field and the first direction is in the range of between 20° and 70°.

2. The liquid crystal display of claim 1, wherein the first electrode comprises at least a diagonal branch extended in one direction perpendicular to the first electric field and at least a diagonal branch extended in the other direction perpendicular to the second electric field,
    wherein the second electrode comprises at least a diagonal bar extended in one direction perpendicular to the first electric field and at least a diagonal bar extended in the other direction perpendicular to the second electric field,
    wherein the diagonal bars of the second electrode are interposed between the diagonal branches of the first electrode.

3. The liquid crystal display of claim 1, further comprising: a first polarizing plate at an outer surface of the lower substrate, and a second polarizing plate at an outer surface of the upper substrate, wherein a polarizing axis of the first polarizing plate is coincided with the first direction or the second direction, and a polarizing axis of the second polarizing plate is perpendicular to the polarizing axis of the first polarizing plate.

4. The liquid crystal display of claim 1, wherein the liquid crystal molecules have positive dielectric anisotropy.

5. The liquid crystal display of claim 4, wherein widths of the diagonal branches of the first electrode and the diagonal bars of the second electrode are smaller than distances between said diagonal branches and said diagonal bars adjoining thereto.

6. The liquid crystal display of claim 1, wherein the liquid crystal molecules have negative dielectric anisotropy.

7. The liquid crystal display of claim 6, wherein widths of the diagonal branches of the first electrode and the diagonal bars of the second electrode are greater than distances between said diagonal branches and said diagonal bars adjoining thereto.

8. The liquid crystal display of claim 1, wherein homeotropic alignment layers are interposed between the lower substrate and the liquid crystal layer, and between the upper substrate and the liquid crystal layer respectively, wherein the first and second electrodes are formed in the lower substrate.

9. The liquid crystal display of claim 1, wherein a selected angle between the first electric field and the first direction is approximately 45°.

10. The liquid crystal display of claim 1, wherein the first and second electrodes are made of transparent metal layer.

11. A homeotropic alignment liquid crystal display having a multi-domain comprising;
    an upper substrate and a lower substrate opposed each other to be spaced apart;
    a liquid crystal layer interposed between inner surfaces of the upper and lower substrates, the liquid crystal layer including a plurality of liquid crystal molecules;
    a gate bus line and a data bus line formed in the lower substrate in a matrix configuration and both defining pixel regions;
    a counter electrode formed at each pixel region in the lower substrate, the counter electrode including a body of a rectangular frame shape, a first branch being disposed parallel to the gate bus line and simultaneously connecting lengthwise sides of the body and dividing a region surrounded by the body into a first space and a second space, a second branch diverged from the body or the first branch toward the first space in the form of a diagonal line, and a third branch diverged from the body or the first branch toward the second space in the form of a diagonal line;
    a pixel electrode formed at each pixel region in the lower substrate and the pixel electrode forming an electric field together with the counter electrode, the pixel electrode including a first bar overlapped with one of the lengthwise sides of the body of the counter electrode and disposed parallel to the data bus line, a second bar diverged from the first bar and extended to be overlapped with the first branch of the counter electrode, a third bar diverged from the first or second bar and interposed between the second branches of the counter electrode in parallel, and the fourth bar diverged from the first bar or the second bar and interposed between the third branches of the counter electrode in parallel;
    a switching means formed adjacent to an intersection of the gate bus line and the data bus line for transmitting a signal from the data bus line to the pixel electrode; and
    homeotropic alignment layers interposed between the lower substrate and the liquid crystal layer and between the upper substrate and the liquid crystal layer, wherein the counter electrode and the pixel electrode are formed in the lower substrate;
    wherein the second branch and the third bar make an angle θ with the first branch of the counter electrode, the third branch and the fourth bar make an angle $-\theta$ with the first branch of the counter electrode;

wherein the angle $\theta$ is in the range of between 20° and 70°.

12. The liquid crystal display of claim 11, further comprising: a first polarizing plate disposed at an outer surface of the lower substrate and a second polarizing plate disposed at an outer surface of the upper substrate, wherein a polarizing axis of the first polarizing plate is coincided with the first direction or the second direction and a polarizing axis of the second polarizing plate is perpendicular to the polarizing axis of the first polarizing plate.

13. The liquid crystal display of claim 11, wherein the liquid crystal molecules have positive dielectric anisotropy.

14. The liquid crystal display of claim 13, wherein widths of the second and third branches of the counter electrode and the third and fourth bars of the pixel electrode are smaller than distances between said second branch and its adjoining third bar or between said third branch and its adjoining fourth bar.

15. The liquid crystal display of claim 11, wherein the liquid crystal molecules have negative dielectric anisotropy.

16. The liquid crystal display of claim 11, wherein widths of the second and third branches of the counter electrode and the third and fourth bars of the pixel electrode are greater than distances between said second branch and its adjoining third bar or between said third branch and its adjoining fourth bar.

17. The liquid crystal display of claim 11, wherein the second and the third branches of the counter electrode and the third and fourth bars of the pixel electrode have a length that they can divide a body region of the counter electrode.

18. The liquid crystal display of claim 11, wherein the counter electrode further comprises a rib for preventing edge electric field generation at a selected corner of the first or the second space of the counter electrode.

19. The liquid crystal display of claim 18, wherein the rib is shaped of a right-angled triangle and each rib is disposed at a corner such that its hypotenuse is disposed parallel to the adjoining second or third branch.

20. The liquid crystal display of claim 18, wherein the counter electrode further comprises another ribs at acute-angled regions between the regions made by meeting the body and the second branch, by meeting the body and the third branch, by meeting the first branch and the second branch and by meeting the first branch and the third branch.

21. The liquid crystal display of claim 18, wherein at least one end of the third bar or the fourth bar of the pixel electrode is bent to a selected direction along an inner surface of the body of the counter electrode.

22. The liquid crystal display of claim 21, wherein the bending portions of the third and fourth bars of the pixel electrode are bent to obtuse-angled regions between the regions formed by meeting the third bar and the body of the counter electrode, by meeting the fourth bar and the body of the counter electrode, by meeting the third bar and the second bar of the pixel electrode and by meeting the fourth bar and the second bar of the pixel electrode.

23. The liquid crystal display of claim 22, wherein the pixel electrode further comprises ribs for preventing edge electric field generation at acute-angled regions between the regions formed by meeting the third bar and the body of the counter electrode, by meeting the fourth bar and the body of the counter electrode, by meeting the third bar and the second bar of the pixel electrode and by meeting the fourth bar and the second bar of the pixel electrode.

24. The liquid crystal display of claim 11, the angle $\theta$ is approximately 45°.

25. The homeotropic alignment liquid crystal display having a multi-domain of claim 1 wherein if the liquid crystal molecules have positive dielectric anisotropy, the widths of the diagonal branches of the first electrode and the diagonal bars of the second electrode are smaller than distances between the diagonal branches of the first electrode and the bars of the second electrode adjoining thereto and, if the liquid crystal molecules have negative dielectric anisotropy, the widths of the diagonal branches of the first electrode and the diagonal bars of the second electrode are greater than distances between the diagonal branches of the first electrode and the bars of the second electrode adjoining thereto.

26. The homeotropic alignment liquid crystal display having a multi-domain of claim 11 wherein if the liquid crystal molecules have positive dielectric anisotropy, the widths of the diagonal branches of the first electrode and the diagonal bars of the second electrode are smaller than distances between the diagonal branches of the first electrode and the bars of the second electrode adjoining thereto and, if the liquid crystal molecules have negative dielectric anisotropy, the widths of the diagonal branches of the first electrode and the diagonal bars of the second electrode are greater than distances between the diagonal branches of the first electrode and the bars of the second electrode adjoining thereto.

* * * * *